(12) United States Patent
Hamada et al.

(10) Patent No.: US 9,327,585 B2
(45) Date of Patent: May 3, 2016

(54) TRIM FOR VEHICLE

(71) Applicant: TOKAI KOGYO CO., LTD., Obu-shi, Aichi (JP)

(72) Inventors: Yo Hamada, Obu (JP); Yosuke Kobayashi, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 0 days.

(21) Appl. No.: 14/386,663

(22) PCT Filed: Feb. 27, 2013

(86) PCT No.: PCT/JP2013/055225
§ 371 (c)(1),
(2) Date: Sep. 19, 2014

(87) PCT Pub. No.: WO2013/161380
PCT Pub. Date: Oct. 31, 2013

(65) Prior Publication Data
US 2015/0082710 A1  Mar. 26, 2015

(30) Foreign Application Priority Data
Apr. 26, 2012  (JP) ................................. 2012-100571

(51) Int. Cl.
*E06B 7/16* (2006.01)
*B60J 10/08* (2006.01)
*B60J 10/00* (2016.01)

(52) U.S. Cl.
CPC ............ *B60J 10/081* (2013.01); *B60J 10/0008* (2013.01); *B60J 10/0031* (2013.01); *B60J 10/0065* (2013.01)

(58) Field of Classification Search
CPC .. B60J 10/081; B60J 10/0008; B60J 10/0065; B60J 10/0031

USPC .................................. 49/475.1, 490.1, 498.1
See application file for complete search history.

(56) References Cited

U.S. PATENT DOCUMENTS

| 4,105,814 | A | * | 8/1978 | Eggert | .......................... 428/122 |
| 4,232,081 | A | | 11/1980 | Pullan | |

(Continued)

FOREIGN PATENT DOCUMENTS

| CN | 102029881 A | 4/2011 |
| EP | 0 174 987 B1 | 11/1989 |

(Continued)

OTHER PUBLICATIONS

Apr. 2, 2013 International Search Report issued in International Patent Application No. PCT/JP2013/055225.

(Continued)

*Primary Examiner* — Jerry Redman
(74) *Attorney, Agent, or Firm* — Oliff PLC

(57) ABSTRACT

When a thickest part of a flange is being inserted into an attachment portion of a weather strip, a main body portion of a holding lip having a smaller coefficient of dynamic friction than that of a contact portion firstly contacts with the flange. Therefore, a frictional force of the holding lip (main body portion) with respect to the flange is made small, and the insertion force is made small to that extent. When the attachment portion is attached to a thinnest part of the flange, the contact portion of the holding lip having a greater coefficient of dynamic friction than that of the main body portion contacts with the flange. Therefore, the frictional force of the holding lip (contact portion) is made large, and the holding lip is made difficult to slip with respect to the flange.

12 Claims, 11 Drawing Sheets

STATE WHEN ATTACHMENT PORTION IS ATTACHED TO THICKEST PART OF FLANGE

STATE WHEN THINNEST PART OF FLANGE IS BEING INSERTED INTO ATTACHMENT PORTION

(56) References Cited

U.S. PATENT DOCUMENTS

| | | | |
|---|---|---|---|
| 4,787,668 A * | 11/1988 | Kawase et al. | 296/93 |
| 4,848,035 A * | 7/1989 | Sakuma et al. | 49/490.1 |
| 4,970,102 A * | 11/1990 | Guillon | 428/122 |
| 5,305,553 A * | 4/1994 | Shimizu et al. | 49/490.1 |
| 5,626,383 A * | 5/1997 | Lee et al. | 296/146.9 |
| 6,548,143 B1 * | 4/2003 | Heller | 428/122 |
| 7,543,881 B2 * | 6/2009 | Okajima et al. | 296/146.9 |
| 8,499,499 B2 * | 8/2013 | Cotnoir | 49/490.1 |
| 8,893,438 B2 * | 11/2014 | Hamada et al. | 49/490.1 |
| 2001/0027622 A1 * | 10/2001 | Mine et al. | 49/490.1 |
| 2007/0209313 A1 * | 9/2007 | Willett | 52/716.8 |
| 2008/0148646 A1 * | 6/2008 | Nozaki et al. | 49/490.1 |
| 2008/0295414 A1 * | 12/2008 | Miyakawa et al. | 49/490.1 |
| 2009/0266000 A1 * | 10/2009 | Minoura et al. | 49/490.1 |
| 2010/0077672 A1 * | 4/2010 | Nozaki | 49/483.1 |
| 2011/0023372 A1 * | 2/2011 | Miyakawa et al. | 49/490.1 |
| 2011/0072729 A1 | 3/2011 | Otsuka et al. | |
| 2014/0311040 A1 * | 10/2014 | One | 49/490.1 |

FOREIGN PATENT DOCUMENTS

| | | | |
|---|---|---|---|
| EP | 0527074 A1 * | 7/1992 | |
| JP | S52-2917 A | 1/1977 | |
| JP | A 53-104925 | 9/1978 | |
| JP | S59-187544 U | 12/1984 | |
| JP | A 61-501318 | 7/1986 | |
| JP | A 2011-111109 | 6/2011 | |
| WO | WO 02090137 A2 * | 11/2002 | |

OTHER PUBLICATIONS

Dec. 4, 2015 Office Action issued in Chinese Patent Application No. 201380015808.0.

Oct. 8, 2015 Office Action issued in Japanese Patent Application No. 2012-100571.

* cited by examiner

A-A CROSS-SECTIONAL VIEW

FIG.3

STATE WHEN THICKEST PART OF FLANGE IS
BEING INSERTED INTO ATTACHMENT PORTION

FIG.4

STATE WHEN ATTACHMENT PORTION IS
ATTACHED TO THICKEST PART OF FLANGE

FIG.5

STATE WHEN THINNEST PART OF FLANGE IS
BEING INSERTED INTO ATTACHMENT PORTION

FIG.6

STATE WHEN ATTACHMENT PORTION IS
ATTACHED TO THINNEST PART OF FLANGE

STATE WHEN ATTACHMENT PORTION IS
ATTACHED TO THICKEST PART OF FLANGE

STATE WHEN ATTACHMENT PORTION IS ATTACHED TO THINNEST PART OF FLANGE

TRIM FOR VEHICLE

TECHNICAL FIELD

The present invention relates to a trim for a vehicle attached to a flange provided along a peripheral edge of an opening of a vehicle body.

BACKGROUND ART

Generally, trims (for example, weather strip or the like) are attached to flanges provided along peripheral edges of openings, such as a door opening and a trunk opening, of vehicle bodies of automobiles or the like. As such trims, for example, as described in Patent Document 1 (JP-A-2011-111109), there is a trim in which holding lips that respectively project from inside surfaces of an exterior lateral wall and an interior lateral wall are integrally provided to an attachment portion (a trim portion) that includes the exterior lateral wall, the interior lateral wall, and a bottom wall that couples both the lateral walls together and has a substantially U-shaped cross-section. Such trim is attached and fixed to a flange by the holding lips contacting with the flange inserted between both the lateral walls of the attachment portion.

CITATION LIST

Patent Literature

[Patent Document 1] JP-A-2011-111109

SUMMARY OF INVENTION

Technical Problem

Incidentally, as for the flange provided along a peripheral edge of an opening of a vehicle body, a thickness thereof in its longitudinal direction may not necessarily be constant, but the thickness thereof may vary depending on regions. Meanwhile, the elongated trim attached to the flange is formed by extrusion molding so as to have a constant cross-sectional shape in a longitudinal direction thereof. For this reason, there is a possibility that the following problems may occur.

When attaching the trim to a thin part of the flange, the thin part of the flange is inserted into the attachment portion of the trim. Then, since the holding lip contact with the thin part of the flange, the amount of elastic deformation of the holding lip becomes small. For this reason, the elastic repulsive force of the holding lip becomes small, and the holding force of the holding lip with respect to the flange becomes small. As a result, there is a possibility that the trim may incline or come off from the flange.

As a countermeasure for this problem, the elastic repulsive force of the holding lip may be increased and the holding force of the holding lip with respect to the flange may be increased by providing the holding lip with a layer made of a material having a higher hardness than that of the holding lip or by thickening a trunk side part of the holding lip. However, if the elastic repulsive force of the holding lip is increased, when the trim is being attached to a thick part of the flange, an insertion force when the thick part of the flange is inserted into the attachment portion of the trim (particularly when the holding lip begins to contact with the flange) becomes large and the attachment workability of the trim deteriorates.

Thus, an object to be achieved by the invention is to provide a trim for vehicle in which the trim can be stably fixed to a thin part of a flange while preventing deterioration of the attachment workability when attaching the trim to a thick part of the flange.

Solution to Problem

In order to solve the above-described problem, the invention provides a trim for a vehicle, which is made of an elastic polymer material and is elongated, the trim including: an attachment portion attachable to a flange provided along a peripheral edge of an opening of a vehicle body and including an exterior lateral wall portion, an interior lateral wall portion, and a top wall portion that connects both the lateral wall portions; and a holding lip projecting from an inside surface of at least one of the exterior lateral wall portion and the interior lateral wall portion, wherein the trim is attached to the flange and arranged between the peripheral edge of the opening and an openable and closable opening-closing member that closes the opening by inserting the flange into the attachment portion so that the holding lip contacts with the flange, and wherein, in at least one holding lip, a contact portion having a greater coefficient of dynamic friction than that of a main body portion of the holding lip is provided to a part of the holding lip, which is provided further toward a tip side than a part of the holding lip that firstly contacts with the flange when a thickest part of the flange is being inserted into the attachment portion and which contacts with the flange when a thinnest part of the flange is inserted into the attachment portion and the attachment portion is attached to the thinnest part of the flange.

In this configuration, in the holding lip, the contact portion having a greater coefficient of dynamic friction than that of the main body portion is provided to the part of the holding lip further toward the tip side than the part of the holding lip that firstly contacts with the flange when the thickest part of the flange is being inserted into the attachment portion. Accordingly, when the thickest part of the flange is being inserted into the attachment portion, the main body portion of the holding lip having a smaller coefficient of dynamic friction than that of the contact portion firstly contacts with the flange. Therefore, the frictional force of the holding lip (main body portion) with respect to the flange can be made small, and the insertion force when the flange is inserted into the attachment portion can be made small to that extent. As a result, deterioration of the attachment workability when the trim is attached to a thick part of the flange can be prevented.

Additionally, in the holding lip, the contact portion having a greater coefficient of dynamic friction than that of the main body portion is provided to the part of the holding lip that contacts with the flange when the thinnest part of the flange is inserted into the attachment portion and the attachment portion is attached to the thinnest part of the flange. Accordingly, when the attachment portion is attached to the thinnest part of the flange, the contact portion of the holding lip having a greater coefficient of dynamic friction than that of the main body portion contacts with the flange. Therefore, the frictional force of the holding lip (contact portion) with respect to the flange can be made large, and the holding lip can be made difficult to slip with respect to the flange. As a result, the trim can be prevented from inclining or coming off from the flange, and the trim can be stably fixed to a thin part of the flange.

In this case, the contact portion may be formed in a layer on a surface of the holding lip at the tip side. Accordingly, the frictional force of the holding lip with respect to the flange at the tip side can be increased while making the flexibility of the holding lip at the tip side to be the same level as that at a trunk side.

Alternatively, the contact portion may form an entire tip portion of the holding lip. Accordingly, the shape of the tip portion (contact portion) of the holding lip can be stably formed.

Incidentally, both the main body portion and the contact portion may be formed from a sponge rubber material that is foamed, and the contact portion may be formed from a sponge rubber material having a lower hardness than that of the main body portion. Accordingly, an adhesion property of the contact portion with respect to the flange can be made higher than that of the main body portion, and the coefficient of dynamic friction of the contact portion with respect to the flange can be made greater than that of the main body portion.

Alternatively, the main body portion may be formed from a sponge rubber material that is foamed, and the contact portion may be formed from a solid rubber material that is not foamed. Accordingly, the surface of the main body portion formed from the sponge rubber material becomes rougher than the surface of the contact portion formed from the solid rubber material. Therefore, a contact area of the main body portion with respect to the flange can be made smaller than that of the contact portion, and the coefficient of dynamic friction of the main body portion with respect to the flange can be made smaller than that of the contact portion (that is, the coefficient of dynamic friction of the contact portion with respect to the flange can be made greater than that of the main body portion).

In addition, the attachment portion may be formed from the same sponge rubber material as the main body portion. Accordingly, at least the attachment portion and the main body portion of the holding lip can be formed from the sponge rubber material, and the weight of the entire trim can be reduced.

Incidentally, the contact portion may be formed from the same material as at least a part of the trim member other than the holding lip. Accordingly, the contact portion can be formed without increasing the kinds of materials to be used for molding of the trim (weather strip).

In addition, a seal portion capable of contacting with the opening-closing member may be integrally provided to the attachment portion. Accordingly, in the trim (weather strip) in which the seal portion is integrally provided to the attachment portion, the trim can be stably fixed to a thin part of the flange while preventing deterioration of the attachment workability when attaching the trim to a thick part of the flange.

In this case, the contact portion may be formed from the same material as the seal portion. Accordingly, it is not necessary to specially prepare a new material (a special material for forming the contact portion), and the contact portion can be formed from the same material as the seal portion.

Alternatively, the contact portion may be formed from the same material as a cover layer that covers the seal portion. Accordingly, it is not necessary to specially prepare a new material (a special material for forming the contact portion), and the contact portion can be formed from the same material as the cover layer.

DESCRIPTION OF EMBODIMENTS

Hereinafter, several embodiments in which modes for carrying out the invention are implemented will be described.

Embodiment 1

Figure 1:
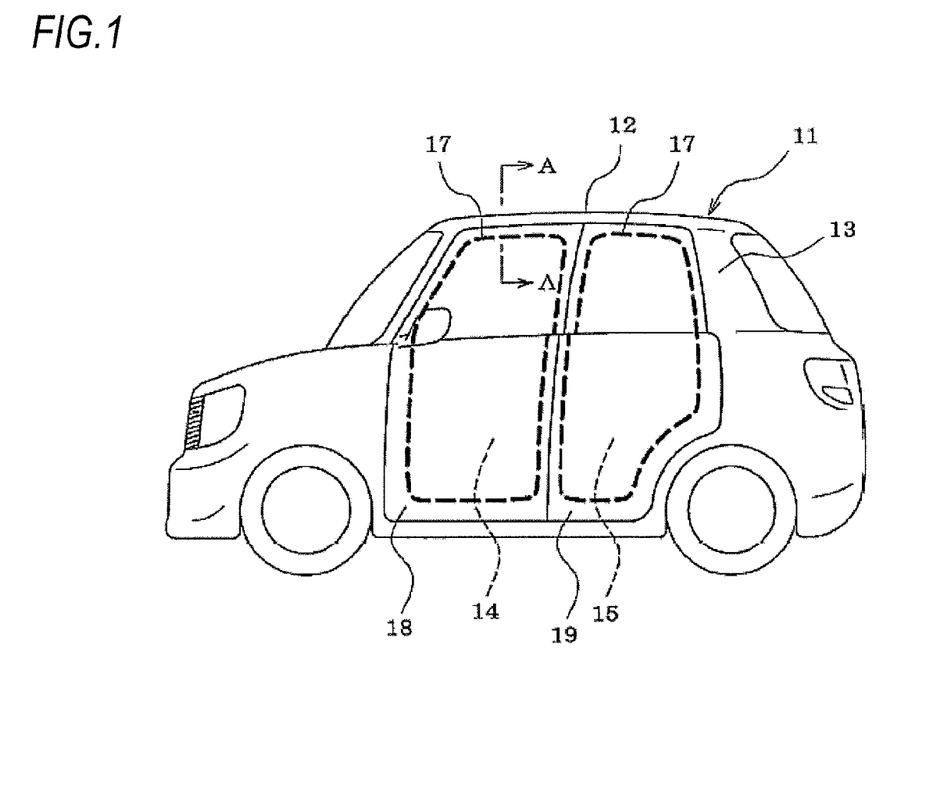
FIG. 1 is a side view showing a schematic configuration of an automobile on which a weather strip in Embodiment 1 of the invention is mounted.

Embodiment 1 of the invention will be described with reference to FIGS. 1 to 6. As shown in FIG. 1, a vehicle body 11 of an automobile is formed by connecting a plurality of panels, such as a roof panel 12 and side panels 13, together. Elongated weather strips 17 (trims) made of an elastic polymer material are respectively attached to flanges 16 (see FIGS. 3 to 6) provided along peripheral edges of a front door opening 14 and a rear door opening 15 of the vehicle body 11. These weather strips 17 seal between the peripheral edge of the front door opening 14 and an openable and closable front door 18 (opening-closing member) that closes the front door opening 14. Further, the weather strips 17 seal between the peripheral edge of the rear door opening 15 and an openable and closable rear door 19 (opening-closing member) that closes the rear door opening 15.

Next, the configuration of a weather strip 17 will be described with reference to FIGS. 2 to 6.

Figure 2:
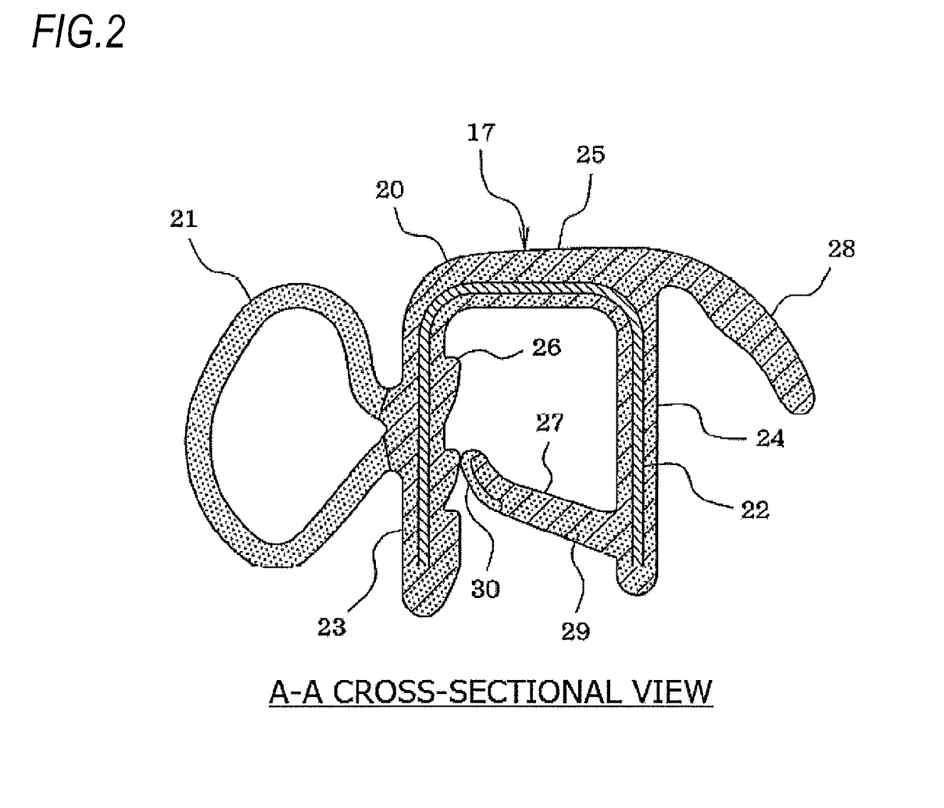
FIG. 2 is a cross-sectional view (A-A cross-sectional view of FIG. 1) of the weather strip of Embodiment 1.

As shown in FIG. 2, in the weather strip 17, an attachment portion 20 with a substantially U-shaped cross-section and a tubular hollow seal portion 21 are formed integrally by extrusion molding of an elastic polymer material, such as rubber or thermoplastic synthetic resin (including thermoplastic elastomer). Further, a core member 22 formed from a metal plate, a resin plate, or the like is buried in the attachment portion 20 by composite extrusion molding.

The attachment portion 20 includes an exterior lateral wall portion 23, an interior lateral wall portion 24, and a top wall portion 25 that couples both the lateral wall portions 23 and 24 together, and the hollow seal portion 21 is integrally provided on an outside surface of the exterior lateral wall portion 23. A plurality of projecting portions 26 that project toward the interior lateral wall portion 24 are integrally formed on an inside surface of the exterior lateral wall portion 23. Further, a holding lip 27 that projects toward the exterior lateral wall portion 23 is integrally formed on an inside surface of the interior lateral wall portion 24. Additionally, a cover lip 28 that projects toward an interior side is integrally formed on an outside surface of the top wall portion 25 (or interior lateral wall portion 24).

Figure 4:
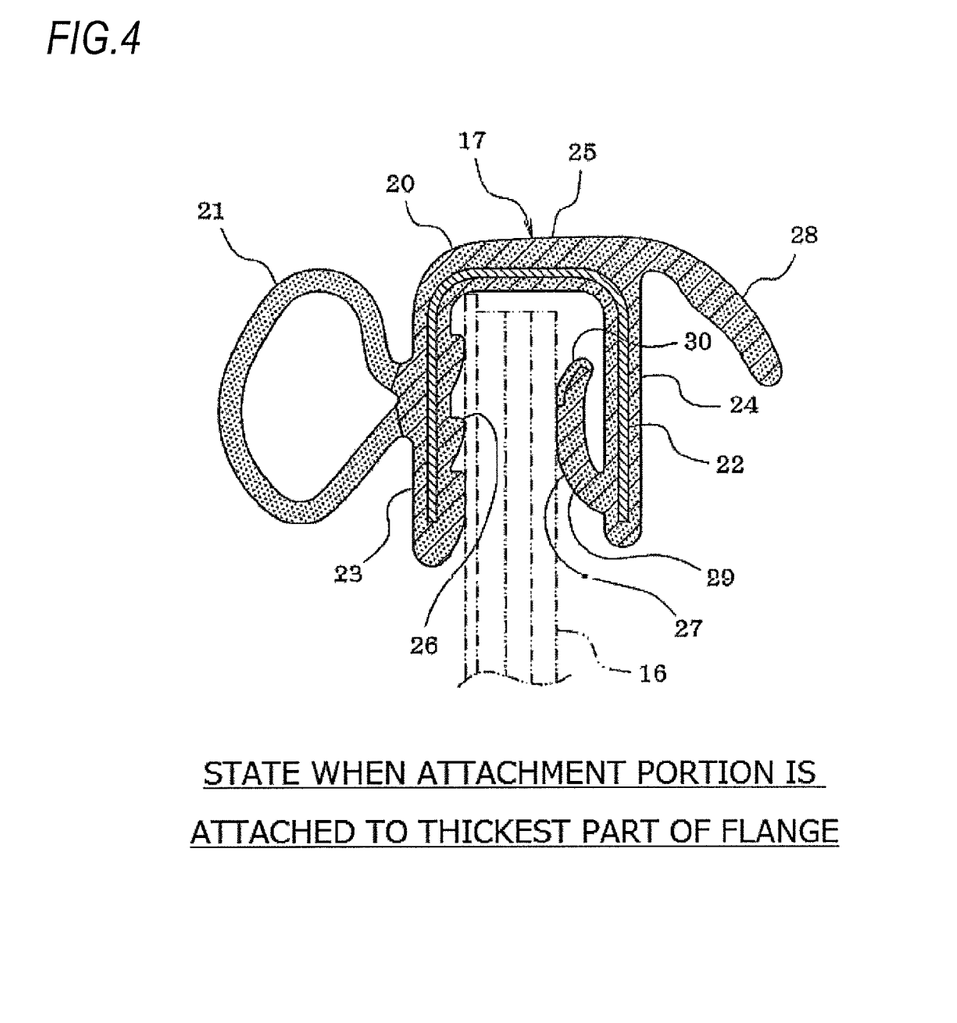
FIG. 4 is a cross-sectional view showing a state when the attachment portion is attached to the thickest part of the flange in the weather strip of Embodiment 1.
Figure 6:
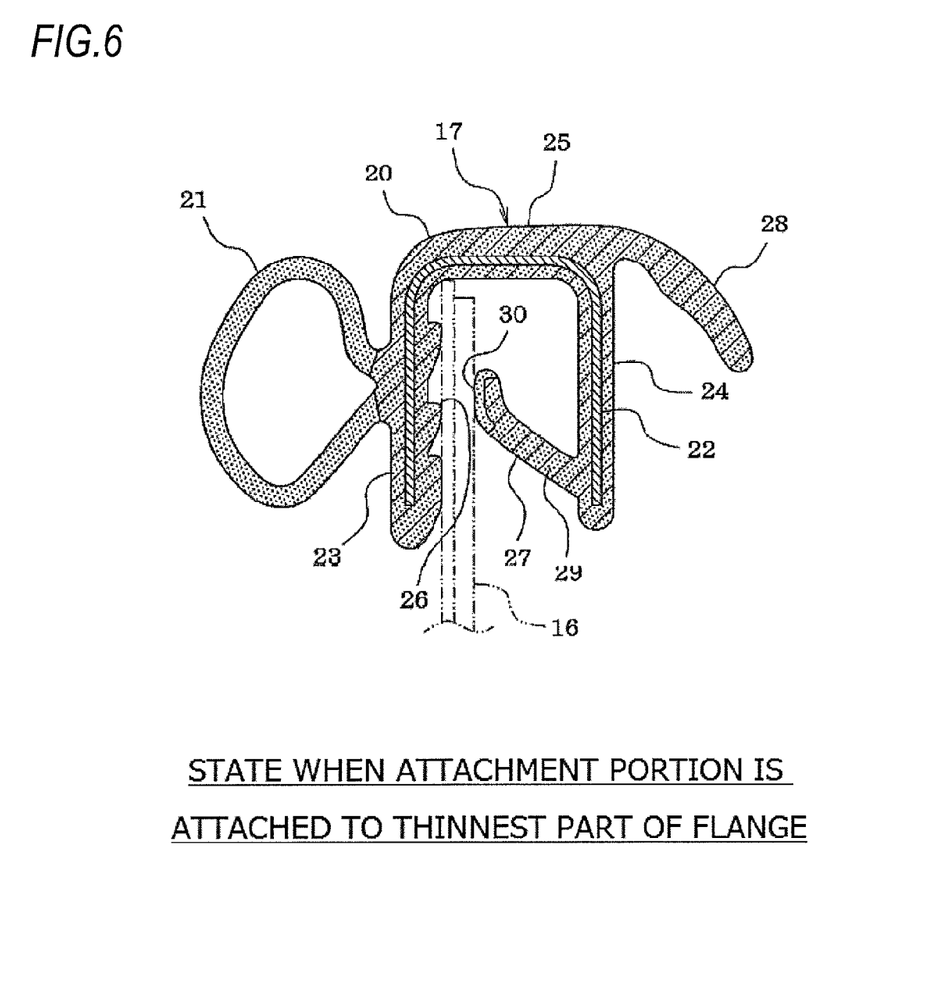
FIG. 6 is a cross-sectional view showing a state when the attachment portion is attached to the thinnest part of the flange in the weather strip of Embodiment 1.

As shown in FIGS. 4 and 6, by covering the flange 16 provided along a peripheral edge of a door opening (the front door opening 14 or the rear door opening 15) with the attachment portion 20 of the weather strip 17, the flange 16 is inserted between both the lateral wall portions 23 and 24 of the attachment portion 20 and the attachment portion 20 is attached to the flange 16. In this case, the holding lip 27 contacts with the flange 16 and is elastically deformed, and the flange 16 is pressed by an elastic repulsive force of the holding lip 27 to sandwich and hold the flange 16 between the holding lip 27 and the projecting portions 26. Accordingly, the weather strip 17 is attached and fixed to the flange 16, and the weather strip 17 is arranged between the peripheral edge of the door opening and a door (the front door 18 or the rear door 19). Also, as the door contacts with the hollow seal portion 21 and the hollow seal portion 21 is elastically deformed when the door is closed, the space between the flange 16 and the door is sealed by the hollow seal portion 21.

Incidentally, the flange 16 provided along the peripheral edge of the door opening is formed by superimposing the plurality of panels, such as the roof panel 12 and the side panels 13. The flange 16 does not have constant thickness in its longitudinal direction, and the thickness of the flange 16 becomes different due to a number or thickness of panels to be superimposed varying depending on regions. That is, a thick part (see FIGS. 3 and 4) or a thin part (see FIGS. 5 and 6) where the flange 16 is thick or thin is present in the longitudinal direction of the flange 16.

Figure 3:
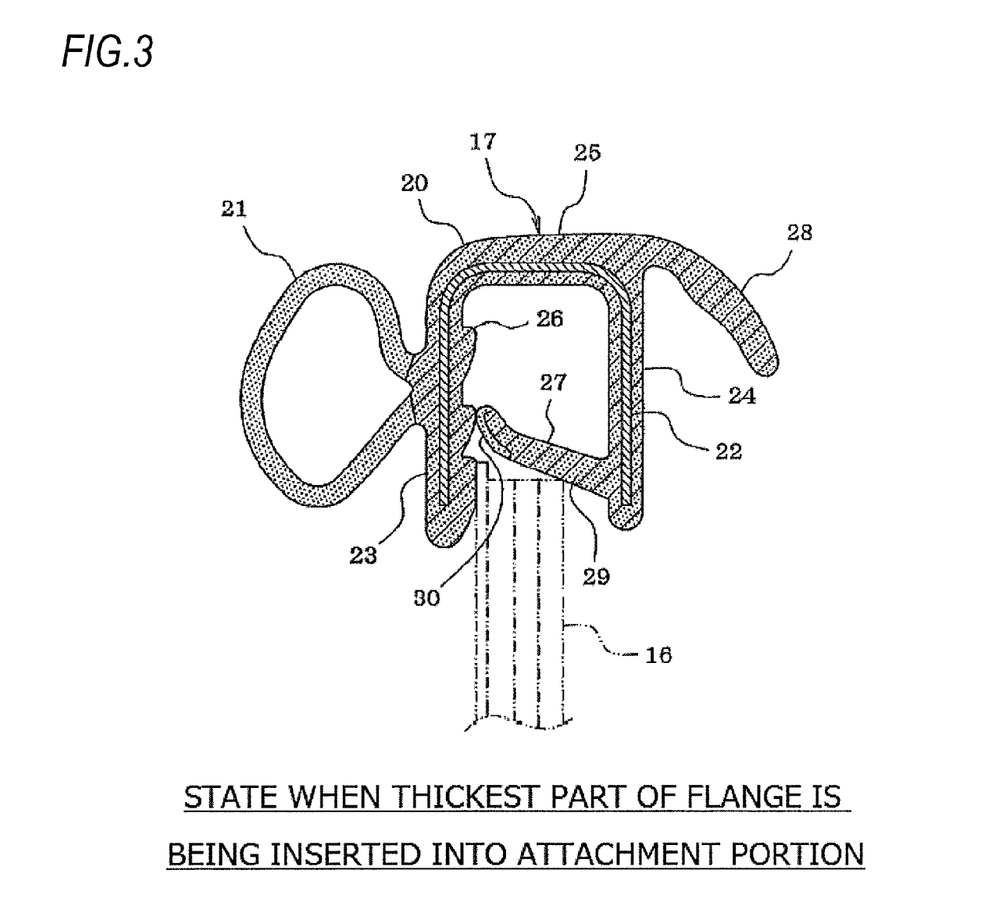
FIG. 3 is a cross-sectional view showing a state when a thickest part of a flange is being inserted into an attachment portion in the weather strip of Embodiment 1.

In order to deal with such a difference in the thickness of the flange 16, a contact portion 30 having a greater coefficient of dynamic friction than that of a main body portion 29 of the holding lip 27 is provided to a tip side of the holding lip 27. The contact portion 30 is provided further toward the tip side than the part of the holding lip 27 that firstly contacts with the flange 16 when the thickest part of the flange 16 is being inserted into the attachment portion 20, as shown in FIG. 3, and is provided to the part of the holding lip 27 that contacts with the flange 16 when the thinnest part of the flange 16 is inserted into the attachment portion 20 and the attachment portion 20 is attached to the thinnest part of the flange 16, as shown in FIG. 6. In the present Embodiment 1, the contact portion 30 is formed in a layer on the surface of the holding lip 27 at the tip side.

Additionally, rubber, such as EPDM, is used as the elastic polymer material for molding the weather strip 17. In the present Embodiment 1, the attachment portion 20 (the exterior lateral wall portion 23, the interior lateral wall portion 24, and the top wall portion 25), the projecting portions 26, the main body portion 29 of the holding lip 27, and the cover lip 28 are formed from a sponge rubber material (a rubber material that is foamed) having a specific gravity of 0.7. Further, the hollow seal portion 21 and the contact portion 30 of the holding lip 27 are formed from the sponge rubber material having a specific gravity of 0.6.

That is, although both the main body portion 29 and the contact portion 30 of the holding lip 27 are formed from the sponge rubber material, the contact portion 30 is formed from the sponge rubber material having a smaller specific gravity and thus a lower hardness than that of the main body portion 29. Therefore, the adhesion property of the contact portion 30 with respect to the flange 16 can be made higher than that of the main body portion 29, and the coefficient of dynamic friction of the contact portion 30 with respect to the flange 16 can be made greater than that of the main body portion 29.

In this case, for example, the coefficient of dynamic friction of the main body portion 29 of the holding lip 27 is 0.78, and the coefficient of dynamic friction of the contact portion 30 of the holding lip 27 is 1.04. These coefficients of dynamic friction are obtained by the following method. First, plates obtained by being cut to 5 mm×50 mm are respectively prepared as samples of the main body portion 29 and the contact portion 30 of the holding lip 27. Each sample is arranged on a coated panel, and the coated panel is pulled in the horizontal direction at a movement speed of 100 mm/min in a state when a load of 500 g is perpendicularly exerted on the sample. A frictional force at this time is measured and a coefficient of dynamic friction is obtained from this frictional force and the load.

Next, a case where the weather strip 17 of the present Embodiment 1 is attached to the thickest part of the flange 16 and a case where the weather strip 17 is attached to the thinnest part of the flange 16 will be described.

In a Case of Attaching to the Thickest Part of the Flange 16

(1) When the Thickest Part of the Flange 16 is Being Inserted into the Attachment Portion 20

As shown in FIG. 3, when the thickest part of the flange 16 is being inserted into the attachment portion 20, since it is necessary to elastically deform the holding lip 27 greatly compared to when the thinnest part of the flange 16 is inserted, an insertion force required when the flange 16 is being inserted into the attachment portion 20 becomes large. Particularly, the insertion force when the holding lip 27 begins to contact with the flange 16 becomes the largest.

In consideration of such circumstances, in the holding lip 27, the contact portion 30 having a greater coefficient of dynamic friction than that of the main body portion 29 is provided at the part of the holding lip 27 further toward the tip side than the part of the holding lip 27 that firstly contacts with the flange 16 when the thickest part of the flange 16 is inserted into the attachment portion 20. Accordingly, when the thickest part of the flange 16 is inserted into the attachment portion 20, the main body portion 29 of the holding lip 27 having a smaller coefficient of dynamic friction than that of the contact portion 30 firstly contacts with the flange 16. Therefore, the frictional force of the holding lip 27 (main body portion 29) with respect to the flange 16 can be made small, and the insertion force when the flange 16 is inserted into the attachment portion 20 can be made small to that extent. As a result, deterioration of the attachment workability when the weather strip 17 is being attached to a thick part of the flange 16 can be prevented.

(2) When the Attachment Portion 20 is Attached to the Thickest Part of the Flange 16

As shown in FIG. 4, when the thickest part of the flange 16 is inserted into the attachment portion 20 and the attachment portion 20 is attached to the thickest part of the flange 16, the holding lip 27 contacts with the thickest part of the flange 16 and is elastically deformed. Therefore, the amount of elastic deformation of the holding lip 27 becomes large and the elastic repulsive force of the holding lip 27 becomes large, compared to when being attached to the thinnest part of the flange 16. Since the flange 16 is pressed with this large elastic repulsive force and the flange 16 is sandwiched and held between the holding lip 27 and the projecting portions 26, a holding force holding the flange 16 becomes large. As a result, the weather strip 17 can be stably fixed to a thick part of the flange 16.

In a Case Attaching to the Thinnest Part of the Flange 16

(1) When the Thinnest Part of the Flange 16 is being Inserted into the Attachment Portion 20

Figure 5:
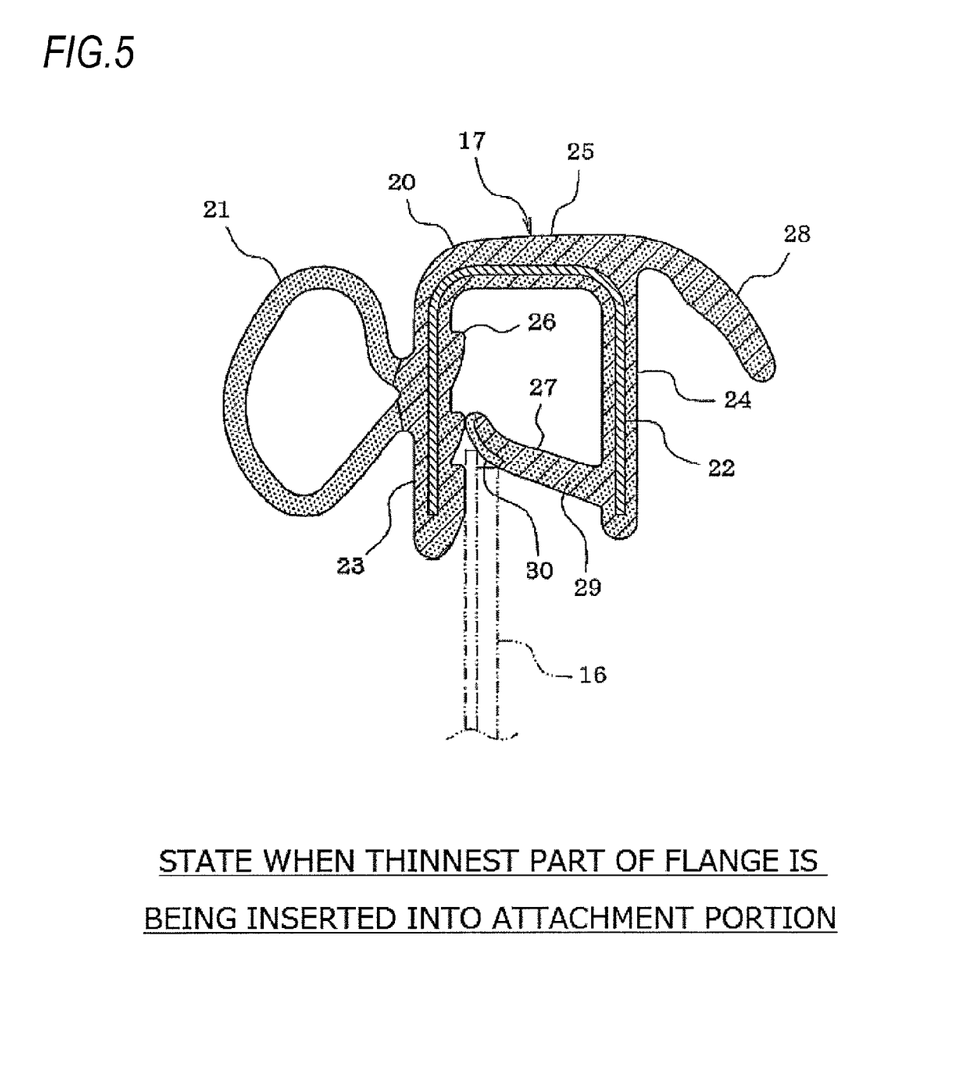
FIG. 5 is a cross-sectional view showing a state when a thinnest part of a flange is being inserted into the attachment portion in the weather strip of Embodiment 1.

As shown in FIG. 5, when the thinnest part of the flange 16 is being inserted into the attachment portion 20, since the amount of elastic deformation of the holding lip 27 becomes small compared to when the thickest part of the flange 16 is being inserted, an insertion force required when the flange 16 is being inserted into the attachment portion 20 becomes small. As a result, the weather strip 17 can be easily attached to a thin part of the flange 16.

(2) When the Attachment Portion 20 is Attached to the Thinnest Part of the Flange 16

As shown in FIG. 6, when the thinnest part of the flange 16 is inserted into the attachment portion 20 and the attachment portion 20 is attached to the thinnest part of the flange 16, the holding lip 27 contacts with the thinnest part of the flange 16 and is elastically deformed. Therefore, the amount of elastic deformation of the holding lip 27 becomes small and the elastic repulsive force of the holding lip 27 becomes small compared to when being attached to the thickest part of the flange 16. Since the flange 16 is pressed with this small elastic repulsive force and the flange 16 is sandwiched and held between the holding lip 27 and the projecting portions 26, a holding force holding the flange 16 becomes small.

In consideration of such circumstances, in the holding lip 27, the contact portion 30 having a greater coefficient of dynamic friction than that of the main body portion 29 is provided to the part of the holding lip 27 that contacts with the flange 16 when the thinnest part of the flange 16 is inserted into the attachment portion 20 and the attachment portion 20 is attached to the thinnest part of the flange 16. Accordingly, when the attachment portion 20 is attached to the thinnest part of the flange 16, the contact portion 30 of the holding lip 27 having a greater coefficient of dynamic friction than that of the main body portion 29 contacts with the flange 16. Therefore, the frictional force of the holding lip 27 (contact portion 30) with respect to the flange 16 can be made large, and the holding lip 27 can be made difficult to slip with respect to the flange 16. As a result, the weather strip 17 can be prevented from inclining or coming off from the flange 16, and the weather strip 17 can be stably fixed to a thin part of the flange 16.

Additionally, in the present Embodiment 1, the contact portion 30 is formed in a layer on the surface of the holding lip 27 at the tip side. Therefore, the frictional force of the holding lip 27 with respect to the flange 16 on the tip side can be increased while making the flexibility of the holding lip 27 at the tip side to be the same level as that at a trunk side.

Moreover, in the present Embodiment 1, the attachment portion 20 (the exterior lateral wall portion 23, the interior lateral wall portion 24, and the top wall portion 25) is formed from the same sponge rubber material as the main body portion 29 or the like (the main body portion 29 of the holding lip 27, the projecting portions 26, the cover lip 28) of the holding lip 27. Therefore, the weight of the entire weather strip 17 can be reduced.

Additionally, in the present Embodiment 1, the contact portion 30 is formed from the same sponge rubber material as the hollow seal portion 21. Therefore, it is not necessary to specially prepare a new material (a special material for forming the contact portion 30), and the contact portion 30 can be formed from the same sponge rubber material as the hollow seal portion 21. As a result, the contact portion 30 can be molded without increasing the kinds of materials or the number of extruders to be used for molding the weather strip 17.

Embodiment 2

Next, Embodiment 2 of the invention will be described with reference to FIGS. 7 to 11. However, description of substantially the same portions as the Embodiment 1 will be omitted or simplified, and portions different from the Embodiment 1 will mainly be described.

Figure 9:
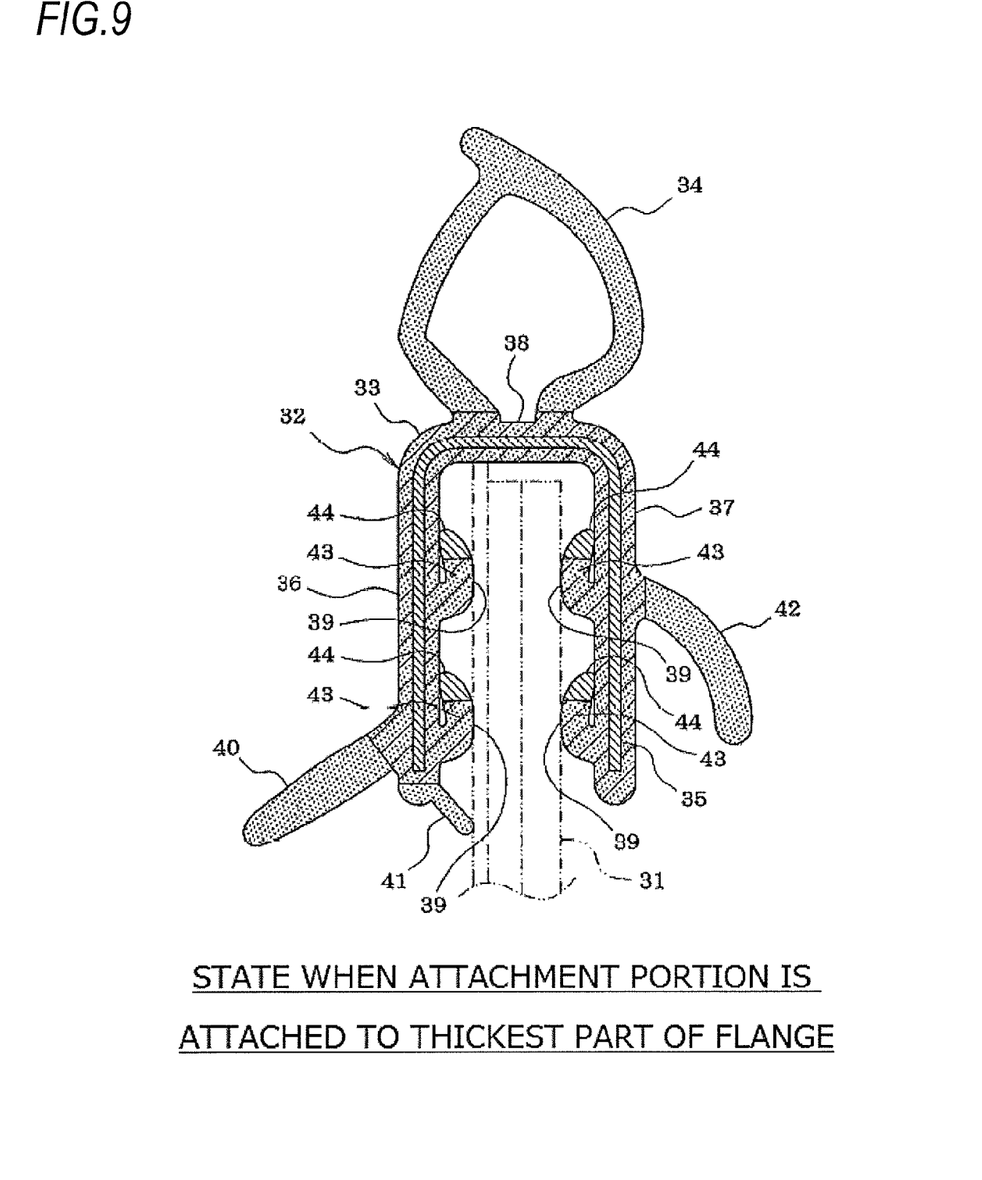
FIG. 9 is a cross-sectional view showing a state when the attachment portion is attached to the thickest part of the flange in the weather strip of Embodiment 2.
Figure 11:
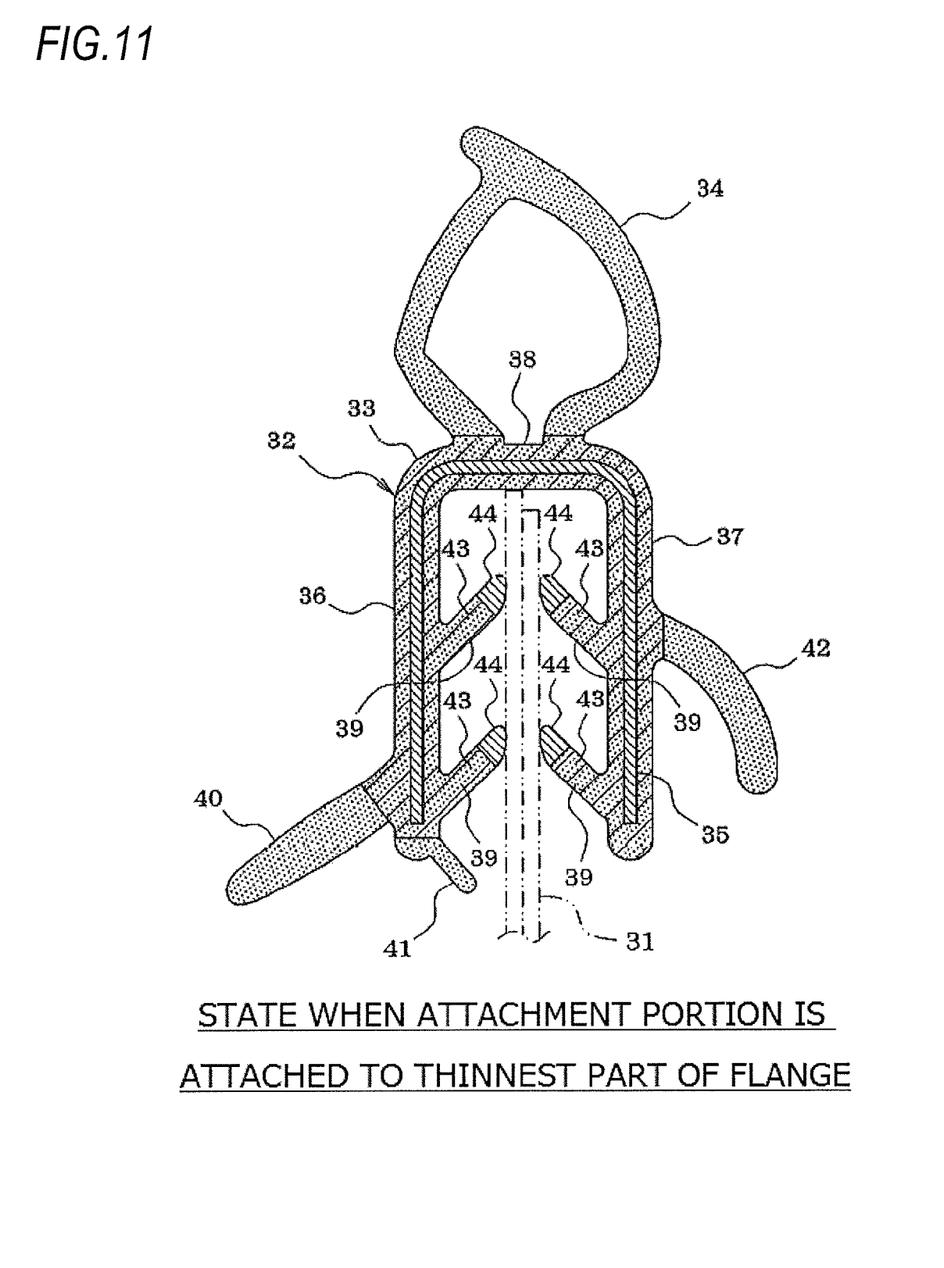
FIG. 11 is a cross-sectional view showing a state when the attachment portion is attached to the thinnest part of the flange in the weather strip of Embodiment 2.

As shown in FIGS. 9 and 11, a weather strip 32 (trim) is attached to a flange 31 provided along a peripheral edge of a backdoor opening (not shown) of the vehicle body 11 (see FIG. 1). A space between the peripheral edge of the backdoor opening and a backdoor (not shown) that is an openable and closable opening-closing member that closes the backdoor opening is sealed by the weather strip 32.

Figure 7:
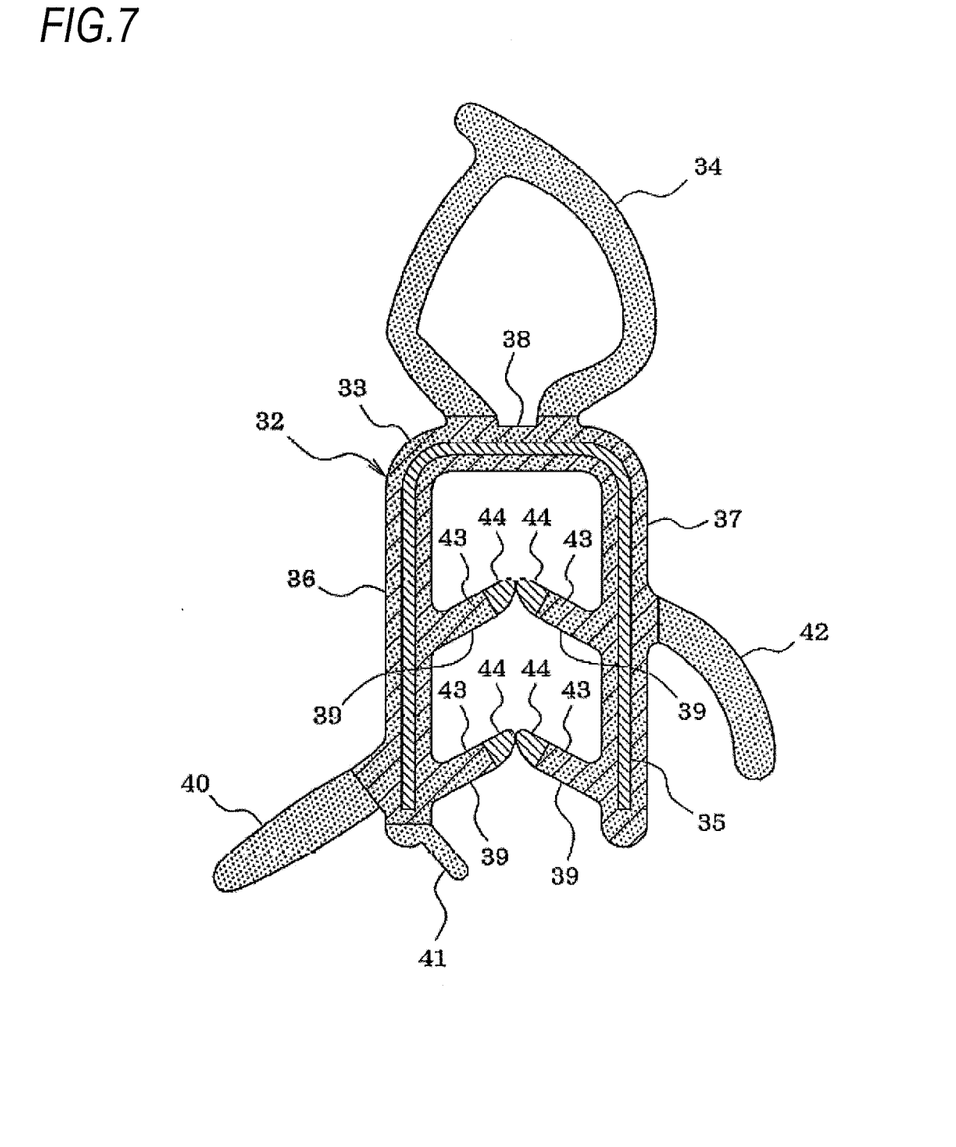
FIG. 7 is a cross-sectional view of the weather strip of Embodiment 2.

As shown in FIG. 7, in the weather strip 32, an attachment portion 33 and a hollow seal portion 34 are integrally formed, and a core member 35 is buried in the attachment portion 33. The attachment portion 33 includes an exterior lateral wall portion 36, an interior lateral wall portion 37, and a top wall portion 38, and the hollow seal portion 34 is integrally provided on an outside surface of the top wall portion 38. The surface (outside surface) of the hollow seal portion 34 is covered with a cover layer (not shown) for enhancing the wear resistance of the hollow seal portion 34.

A plurality of holding lips 39 (for example, two) that project so as to face each other are respectively integrally formed on an inside surface of the exterior lateral wall portion 36 and the inside surface of the interior lateral wall portion 37. Additionally, a first seal lip 40 that projects toward an exterior side is integrally formed on an outside surface of the exterior lateral wall portion 36, and a second seal lip 41 that projects toward an interior side is integrally formed at a tip portion of the exterior lateral wall portion 36. Moreover, a cover lip 42 that projects toward the interior side is integrally formed on an outside surface of the interior lateral wall portion 37.

As shown in FIGS. 9 and 11, by covering the flange 31 provided along a peripheral edge of a backdoor opening with the attachment portion 33 of the weather strip 32, the flange 31 is inserted between both of the wall portions 36 and 37 of the attachment portion 33 and the attachment portion 33 is attached to the flange 31. In this case, the respective holding lips 39 contacts with the flange 31 and are elastically deformed, and the flange 31 is pressed by elastic repulsive forces of the respective holding lips 39 to sandwich and hold the flange 31 between the facing holding lips 39. Accordingly, the weather strip 32 is attached and fixed to the flange 31, and the weather strip 32 is arranged between the peripheral edge of the backdoor opening and a backdoor. Also, as the backdoor contacts with the hollow seal portion 34 and the hollow seal portion 34 is elastically deformed when the backdoor is closed, the space between the flange 31 and the backdoor is sealed by the hollow seal portion 34.

Figure 8:
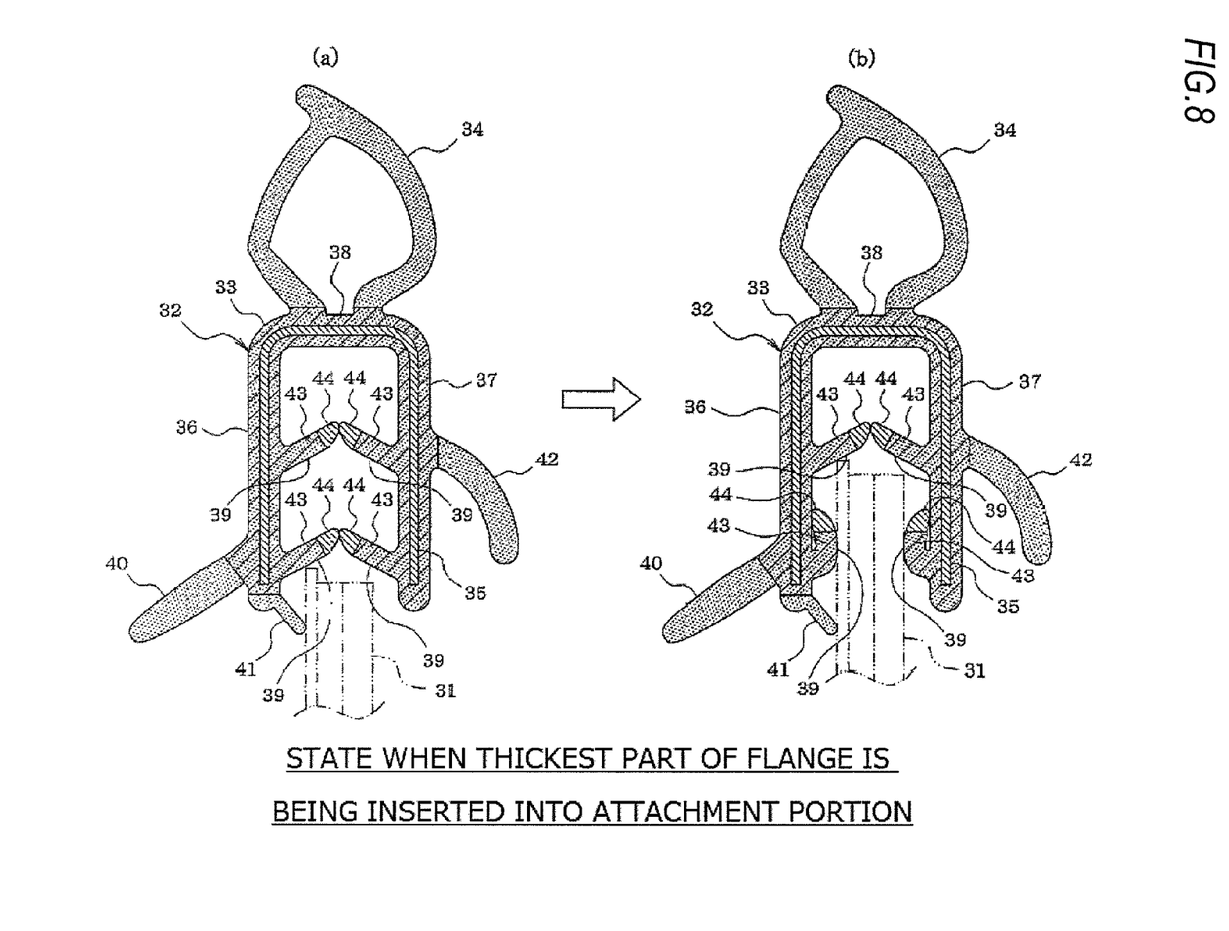
FIG. 8 is a cross-sectional view showing a state when a thickest part of a flange is being inserted into an attachment portion in the weather strip of Embodiment 2.

Contact portions 44 having a greater coefficient of dynamic friction than that of the main body portions 43 of the holding lips 39 are respectively provided on tip sides of the respective holding lips 39. Each contact portion 44 is provided further toward the tip side than the part of the holding lip 39 that firstly contacts with the flange 31 when the thickest part of the flange 31 is being inserted into the attachment portion 33, as shown in FIG. 8, and is provided at the part of the holding lip 39 that contacts with the flange 31 when the thinnest part of the flange 31 is inserted into the attachment portion 33 and the attachment portion 33 is attached to the thinnest part of the flange 31, as shown in FIG. 11. In the present Embodiment 2, the entire tip portions of the respective holding lips 39 are respectively formed from the contact portions 44.

Additionally, rubber, such as EPDM, is used as the elastic polymer material for molding the weather strip 32. In the present Embodiment 2, the attachment portion 33 (the exterior lateral wall portion 36, the interior lateral wall portion 37, and the top wall portion 38) and the main body portions 43 of the holding lips 39 are formed from a sponge rubber material having a specific gravity 0.7. Further, the hollow seal portion 34, the first and second seal lips 40 and 41, and the cover lip 42 are formed from the sponge rubber material having a specific gravity of 0.6. Additionally, a cover layer that covers the hollow seal portion 34, and the contact portions 44 of the holding lips 39 are formed from a solid rubber material (a rubber material that is not foamed) having a specific gravity of 1.3.

That is, although the main body portions 43 of the holding lips 39 are formed from the sponge rubber material, the contact portions 44 of the holding lips 39 are formed from the solid rubber material. Therefore, the surfaces of the main body portions 43 formed from the sponge rubber material become rougher than the surfaces of the contact portions 44 formed from the solid rubber material, and the contact area of the main body portions 43 with respect to the flange 31 can be made smaller than that of the contact portions 44. Therefore, the coefficient of dynamic friction of the main body portions 43 with respect to the flange 31 can be made smaller than that of the contact portions 44 (that is, the coefficients of dynamic friction of the contact portions 44 with respect to the flange 31 can be made greater than that of the main body portion 43).

In this case, for example, the coefficient of dynamic friction of the main body portions 43 of the holding lips 39 is 0.78, and the coefficient of dynamic friction of the contact portions 44 of the holding lips 39 is 0.92. These coefficients of dynamic friction are obtained by the method described in Embodiment 1.

Next, a case where the weather strip 32 of the present Embodiment 2 is attached to the thickest part of the flange 31 and a case where the weather strip is attached to the thinnest part of the flange 31 will be described.

In a Case of Attaching to the Thickest Part of the Flange 31

(1) When the Thickest Part of the Flange 31 is being Inserted into the Attachment Portion 33

As shown in FIG. 8, when the thickest part of the flange 31 is being inserted into the attachment portion 33, the main body portions 43 of the holding lips 39 having a smaller coefficient of dynamic friction than that of the contact portions 44 firstly contacts with the flange 31. Therefore, the frictional force of the holding lips 39 (main body portions 43) with respect to the flange 31 can be made small, and the insertion force when the flange 31 is being inserted into the attachment portion 33 can be made small to that extent. As a result, deterioration of the attachment workability when the weather strip 32 is attached to a thick part of the flange 31 can be prevented.

(2) When the Attachment Portion 33 is Attached to the Thickest Part of the Flange 31

As shown in FIG. 9, when the thickest part of the flange 31 is inserted into the attachment portion 33 and the attachment portion 33 is attached to the thickest part of the flange 31, the holding lips 39 contact with the thickest part of the flange 31 and are elastically deformed. Therefore, the amounts of elastic deformation of the holding lips 39 become large and the elastic repulsive forces of the holding lips 39 become large, compared to when being attached to the thinnest part of the flange 31. Since the flange 31 is pressed with the large elastic repulsive forces and the flange 31 is sandwiched and held between the holding lips 39, a holding force holding the flange 31 becomes large. As a result, the weather strip 32 can be stably fixed to a thick part of the flange 31.

In a Case of Attaching to the Thinnest Part of the Flange 31

(1) When the Thinnest Part of the Flange 31 is being Inserted into the Attachment Portion 33

Figure 10:
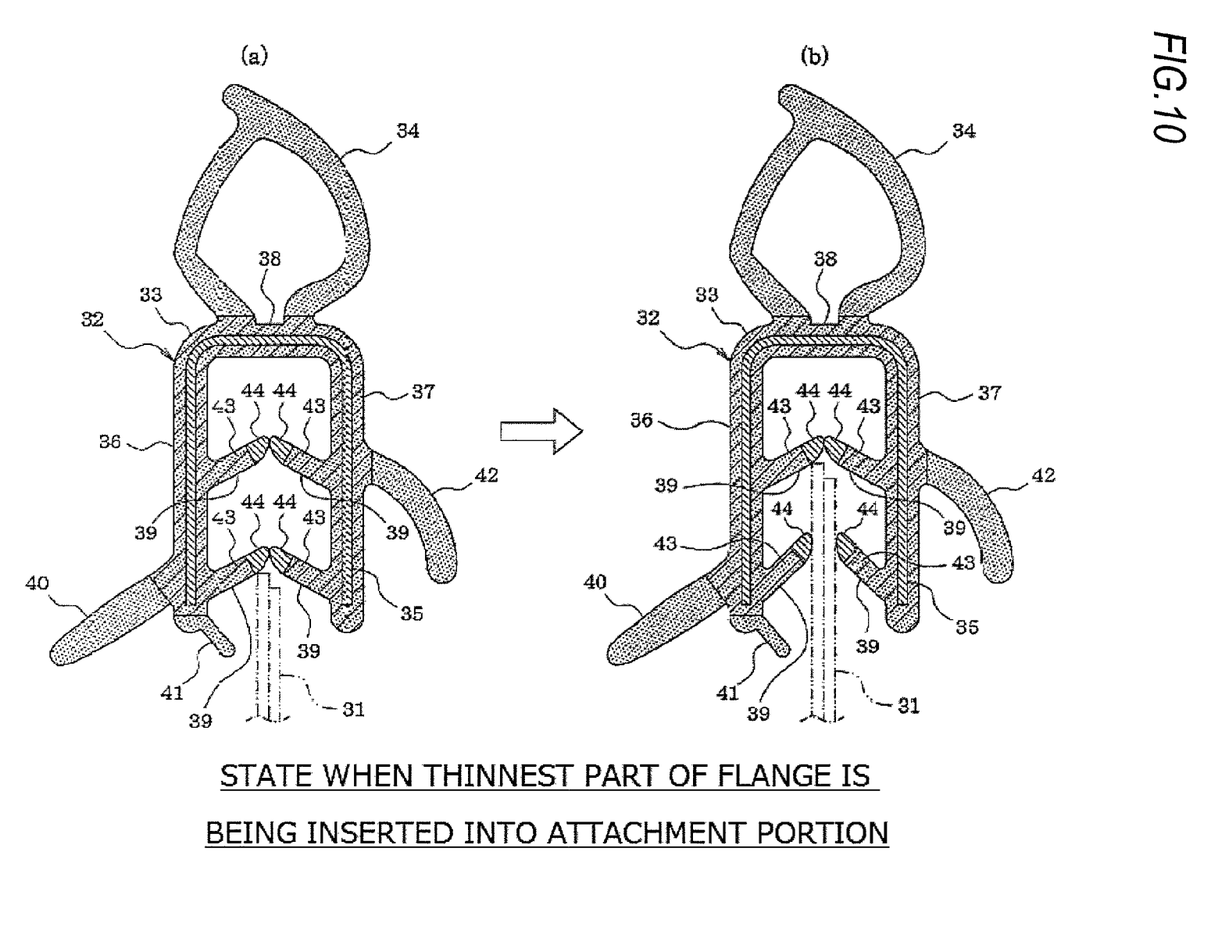
FIG. 10 is a cross-sectional view showing a state when the thinnest part of a flange is being inserted into the attachment portion in the weather strip of Embodiment 2.

As shown in FIG. 10, when the thinnest part of the flange 31 is being inserted into the attachment portion 33, the amounts of elastic deformation of the holding lips 39 become small compared to when the thickest part of the flange 31 is being inserted. Therefore, an insertion force required when the flange 31 is being inserted into the attachment portion 33 becomes small. As a result, the weather strip 32 can be easily attached to a thin part of the flange 31.

(2) When the Attachment Portion 33 is Attached to the Thinnest Part of the Flange 31

As shown in FIG. 11, when the attachment portion 33 is attached to the thinnest part of the flange 31, the contact portions 44 of the holding lips 39 having a greater coefficient of dynamic friction than that of the main body portions 43 contact with the flange 31. Therefore, the frictional forces of the holding lips 39 (contact portions 44) with respect to the flange 31 can be made large, and the holding lips 39 can be made difficult to slip with respect to the flange 31. As a result, the weather strip 32 can be prevented from inclining or coming off from the flange 31, and the weather strip 32 can be stably fixed to a thin part of the flange 31.

Additionally, in the present Embodiment 2, the entire tip portions of the holding lips 39 are formed from the contact portions 44. Therefore, the shape of the tip portions (contact portions 44) of the holding lips 39 can be molded with high precision, and the shape of the tip portions (contact portions 44) of the holding lips 39 can be stably formed.

Moreover, in the present Embodiment 2, the attachment portion 33 (the exterior lateral wall portion 36, the interior lateral wall portion 37, and the top wall portion 38) is formed from the same sponge rubber material as the main body portions 43 of the holding lips 39. Therefore, the weight of the entire weather strip 32 can be reduced.

Additionally, in the present Embodiment 2, the contact portions 44 are formed from the same solid rubber material as the cover layer that covers the hollow seal portion 34. Therefore, it is not necessary to specially prepare a new material (a special material for forming the contact portions 44), and the contact portions 44 can be formed from the same solid rubber material as the cover layer that covers the hollow seal portion 34. As a result, the contact portions 44 can be molded without increasing the kinds of materials or the number of extruders to be used for molding of the weather strip 32.

In addition, in the aforementioned Embodiment 2, the contact portions 44 are provided to all of the holding lips 39. However, the invention is not limited thereto. For example, the contact portion 44 may be provided to at least one of the plurality of holding lips 39.

Additionally, in the aforementioned respective Embodiments 1 and 2, the invention is applied to the weather strip attached to the flange provided along the peripheral edge of the door opening (the front door opening, the rear door opening, or the backdoor opening). However, the invention is not limited thereto. For example, the invention may be applied to weather strips attached to flanges provided along peripheral edges of various openings of a vehicle body, such as a trunk opening.

Additionally, in the aforementioned respective Embodiments 1 and 2, the invention is applied to the trim (weather strip) in which the tubular hollow seal portion is integrally provided to the attachment portion. However, the invention is not limited thereto. For example, the invention may be applied to a trim in which a non-hollow seal portion that has no hollow portion is integrally provided to the attachment portion, or the invention may be applied to a trim that does not include a seal portion (a hollow seal portion or a non-hollow seal portion).

In addition, the invention can be variously modified and implemented without departing from the scope thereof. For example, the shapes of the respective portions (the attachment portion, the seal portion, the holding lip, the contact portion, and the like) of the trim, the number of holding lips, or the like may be appropriately changed.

REFERENCE SIGNS LIST

11: VEHICLE BODY
14: FRONT DOOR OPENING
15: REAR DOOR OPENING
16: FLANGE
17: WEATHER STRIP (TRIM)
18: FRONT DOOR (OPENING-CLOSING MEMBER)
19: REAR DOOR (OPENING-CLOSING MEMBER)
20: ATTACHMENT PORTION
21: HOLLOW SEAL PORTION
23: EXTERIOR LATERAL WALL PORTION
24: INTERIOR LATERAL WALL PORTION
25: TOP WALL PORTION
27: HOLDING LIP
29: MAIN BODY PORTION
30: CONTACT PORTION
31: FLANGE
32: WEATHER STRIP (TRIM)
33: ATTACHMENT PORTION
34: HOLLOW SEAL PORTION
36: EXTERIOR LATERAL WALL PORTION
37: INTERIOR LATERAL WALL PORTION
38: TOP WALL PORTION
39: HOLDING LIP
43: MAIN BODY PORTION
44: CONTACT PORTION

The invention claimed is:

1. A trim for a vehicle, which is made of an elastic polymer material and is elongated, the trim comprising:
an attachment portion attachable to a flange provided along a peripheral edge of an opening of a vehicle body and including an exterior lateral wall portion, an interior lateral wall portion, and a top wall portion that connects both the lateral wall portions; and
a holding lip projecting from an inside surface of at least one of the exterior lateral wall portion and the interior lateral wall portion,
wherein the trim is attached to the flange and arranged between the peripheral edge of the opening and an openable and closable opening and closing member that closes the opening by inserting the flange into the attachment portion so that the holding lip contacts with the flange, and
wherein, in at least one holding lip, a contact portion having a greater coefficient of dynamic friction than that of a main body portion of the holding lip is provided to a part of the holding lip, which is provided further toward a tip side than a part of the holding lip that firstly contacts with the flange when a thickest part of the flange is being inserted into the attachment portion and which contacts with the flange when a thinnest part of the flange is inserted into the attachment portion and the attachment portion is attached to the thinnest part of the flange, wherein the contact portion is further provided at a position beyond a tip of a tip portion of the holding lip, and wherein the attachment portion and the main body portion of the holding lip are formed from a sponge rubber material.

2. The trim for a vehicle according to claim 1, wherein the contact portion is formed in a layer on a surface of the holding lip at the tip side.

3. The trim for a vehicle according to claim 1, wherein the contact portion forms an entire tip portion of the holding lip.

4. The trim for a vehicle according to claim 1, wherein both the main body portion and the contact portion are formed from a sponge rubber material that is foamed, and
wherein the contact portion is formed from a sponge rubber material having a lower hardness than that of the main body portion.

5. The trim for a vehicle according to claim 4, wherein the attachment portion is formed from the same sponge rubber material as the main body portion.

6. The trim for a vehicle according to claim 1, wherein the main body portion is formed from a sponge rubber material that is foamed, and
wherein the contact portion is formed from a solid rubber material that is not foamed.

7. The trim for a vehicle according to claim 6, wherein the attachment portion is formed from the same sponge rubber material as the main body portion.

8. The trim for a vehicle according to claim 1, wherein the contact portion is formed from the same material as at least a part of the trim member other than the holding lip.

9. The trim for a vehicle according to claim 1, wherein a seal portion capable of contacting with the opening and closing member is integrally provided to the attachment portion.

10. The trim for a vehicle according to claim 9, wherein the contact portion is formed from the same material as the seal portion.

11. The trim for a vehicle according to claim 9, wherein the contact portion is formed from the same material as a cover layer that covers the seal portion.

12. The trim for a vehicle according to claim 1, wherein the tip portion of the holding lip comprises a first tip side provided at a position at an entrance of the trim and a second tip side provided at a position opposite or away from the first tip side such that the contact portion extends beyond only the first tip side of the tip of the tip portion of the holding lip.

* * * * *